United States Patent [19]
Tamura

[11] 4,360,080
[45] Nov. 23, 1982

[54] CALIPER BRAKE STRUCTURE TO FACILITATE CHANGING OF BRAKE ELEMENTS

[75] Inventor: Koichi Tamura, Tokyo, Japan

[73] Assignee: Tokico Ltd., Kawasaki, Japan

[21] Appl. No.: 205,979

[22] Filed: Nov. 12, 1980

[30] Foreign Application Priority Data

Nov. 19, 1979 [JP] Japan .......................... 54-160033[U]

[51] Int. Cl.³ ............................................. F16D 65/14
[52] U.S. Cl. ................................. 188/73.33; 188/72.7
[58] Field of Search ................... 188/71.1, 72.7, 73.32, 188/73.33, 73.39, 73.45

[56] References Cited

U.S. PATENT DOCUMENTS

4,222,465 9/1980 Haraikawa et al. ............. 188/73.45
4,228,875 10/1980 Haraikawa et al. ............. 188/72.7

FOREIGN PATENT DOCUMENTS

54-103964 8/1979 Japan ................................. 188/71.1

*Primary Examiner*—George E. A. Halvosa
*Attorney, Agent, or Firm*—Wenderoth, Lind & Ponack

[57] ABSTRACT

A disc brake including a stationary member provided on one side of a rotatable disc, a caliper slidably mounted on the stationary member and having an arm portion straddling the disc, a mechanical brake actuating mechanism incorporated in the caliper to act on a first friction pad and through the arm portion a second friction pad, a pin mounted on the stationary member which extends to the other side of the disc for slidably supporting the second friction pad, the arrangement being such that the caliper can be displaced on the stationary member to form a space between the arm portion and the second friction pad, and the second friction pad can be dismounted from the pin by utilizing the space. A projection is formed on either the stationary member or the actuating lever to abut with the other of the stationary member and the actuating lever when the caliper is displaced on the stationary member in the direction forming the space and in the non-actuated condition of the brake.

3 Claims, 7 Drawing Figures

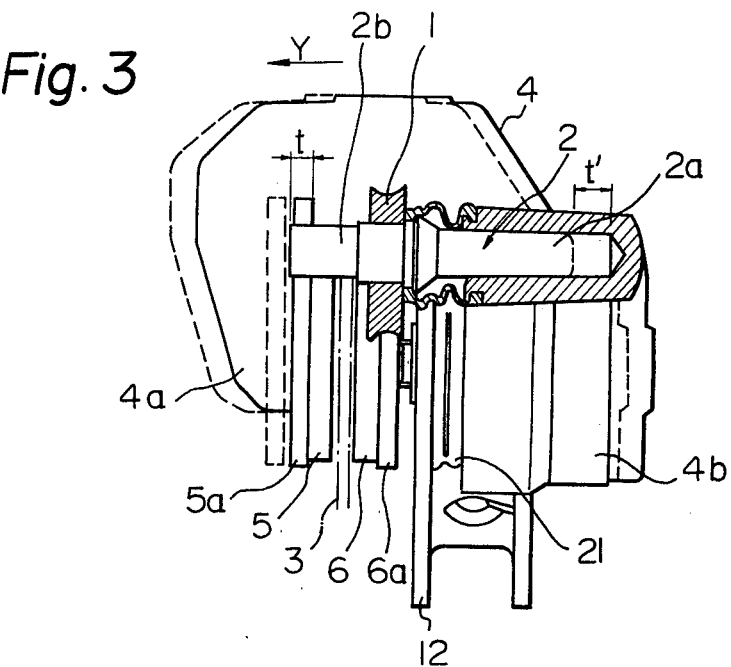
Fig. 3
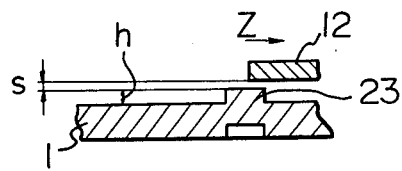
Fig. 4
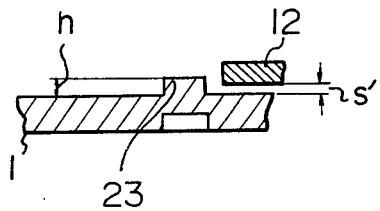
Fig. 5
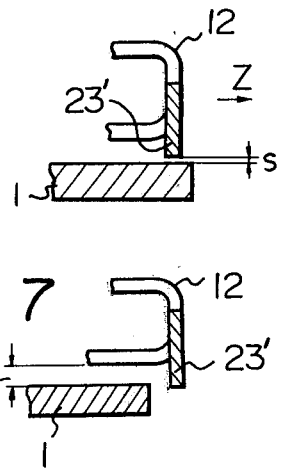
Fig. 6
Fig. 7

4,360,080

CALIPER BRAKE STRUCTURE TO FACILITATE CHANGING OF BRAKE ELEMENTS

BACKGROUND OF THE INVENTION

This invention relates to a mechanical disc brake for use in a vehicle, and, particularly to a mechanical disc brake of the kind including a stationary member provided on one side of a rotatable disc, a caliper having a main body portion slidably mounted on the stationary member and an arm portion straddling the circumferential edge of the disc, a first friction pad provided on the one side of the disc and a second friction pad provided on the other side of the disc, at least one pin secured to the stationary member and extending to the other side of the disc for slidably supporting thereon the second friction pad, and an actuating lever rotatably mounted on the main body portion of the caliper.

The actuating lever is connected to a brake pedal or a brake lever through a cable, and an input force applied to the actuating lever to rotate it is converted to a linear output force which is applied to the friction pads, thereby effecting the braking action. The linear output force acts directly on the first friction pad to press the friction pad against the one side of the disc, and the reaction force generated thereby displaces the caliper so that the arm portion thereof presses the second friction pad against the disc.

In exchanging the second or the outer friction pad the caliper is displaced relative to the stationary member in the direction such that the arm portion of the caliper separates from the second friction pad to form a space therebetween, and the second friction pad is dismounted from or mounted on the pin by utilizing the space. Usually there are two circumferentially spaced parallel pins.

The construction is advantageous since the second friction pad can be exchanged very easily. However there is a problem that the caliper may be displaced due to such conditions as vibrations when operating the vehicle while the brake is in the non-actuated condition thereby forming the space between the caliper and the friction pad such that the friction pad will escape from the pin.

SUMMARY OF THE INVENTION

The present invention aims to solve the problem described above by providing a projection on either the stationary member or the actuating lever for abutting with the other of the stationary member and the actuating lever when the main body portion of the caliper is displaced toward the stationary member and in the non-actuated condition of the brake.

The present invention will now be further explained with reference to accompanying drawings exemplifying some embodiments of the present invention.

BRIEF DESCRIPTION OF THE DRAWINGS

In the drawings:

FIG. 3 is a sectional view taken along line III—III in FIG. 1;

FIG. 4 is a partial sectional view taken along line IV—IV in FIG. 1, and showing the positional relationship between a stationary member and an actuating lever;

FIG. 5 is a view similar to FIG. 4 but showing the actuated condition of the actuating lever;

FIG. 6 is a view similar to FIG. 4 but showing a second embodiment, and

FIG. 7 is a view similar to FIG. 6 but showing the actuating lever in the actuated condition.

DETAILED DESCRIPTION OF THE PREFERRED EMBODIMENTS

Figure 1:
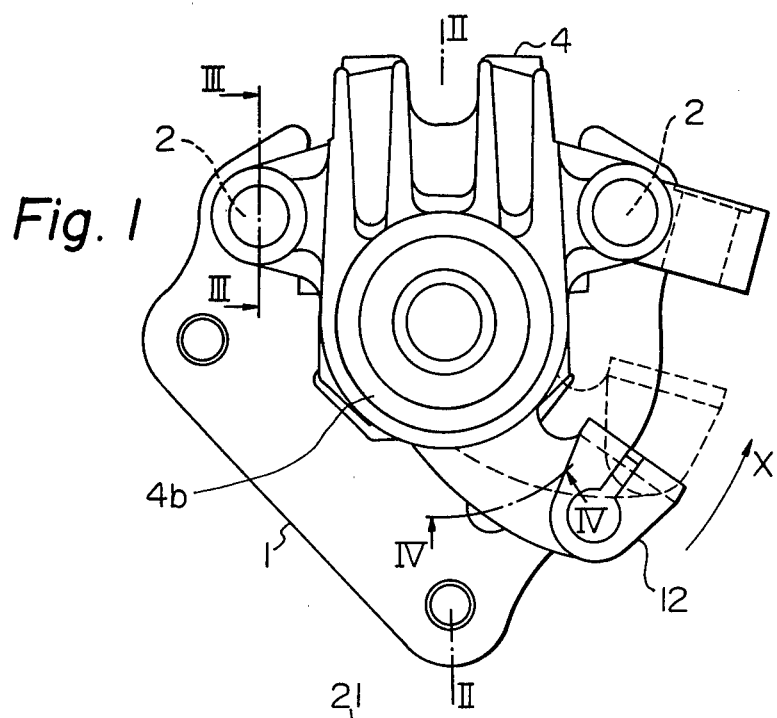
FIG. 1 is a front view of a disc brake according to the invention.
Figure 2:
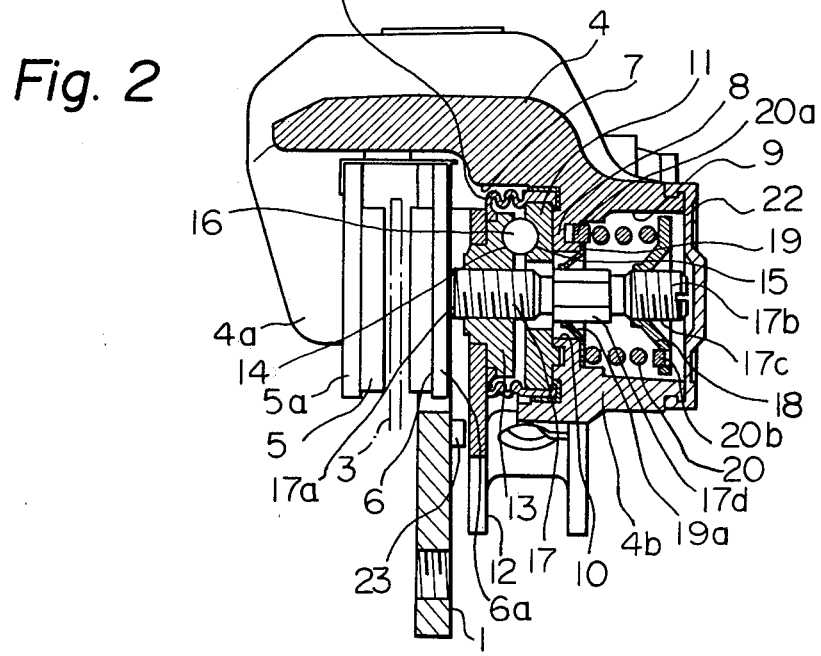
FIG. 2 is a sectional view taken along line II—II in FIG. 1.

The disc brake illustrated in FIGS. 1-3 comprises a stationary member 1 provided on one side of a rotatable disc 3 and adapted to be secured to a non-rotatable part of a vehicle (not shown), two pins 2 secured to the stationary member 1, a caliper 4 having an arm portion 4a and a main body portion 4b, and an outer friction pad 5 and an inner friction pad 6 respectively having backing plates 5a and 6a. The main body portion 4b of the caliper 4 is slidingly mounted on first portions 2a of the pins 2, and the arm portion 4a of the caliper 4 straddles the circumferential edge of the disc 3 to extend to the rear side of the backing plate 5a of the friction pad 5. The friction pad 5 is slidingly supported on second portions 2b of the pins 2 which also straddle the circumferential edge of the disc 3 to extend past the disc 3 by a predetermined distance.

A recess 7 is formed in the main body portion 4b of the caliper 4 which opens toward the friction pad 6 and is partitioned from a recess 9 by a partitioning wall 8. A central bore 10 is formed in the wall 8 to connect the recesses 7 and 9.

A ramp plate 11 is non-rotatably mounted on the wall 8 and is provided in the recess 7. A nut 13 secured to an input lever or an actuating lever 12 is disposed opposite to the ramp plate 11 with at least on ball 16 therebetween. Preferably, three circumferentially spaced balls 16 are provided respectively in inclined grooves 14 and 15 which are provided respectively in opposing surfaces of the nut 13 and the ramp plate 11. The actuating lever 12 is rotatably mounted on the main body portion 4b of the caliper 4 and is connected to actuating means such as a brake pedal (not shown) by a cable or the like (not shown).

A rod 17 threadingly engages with the nut 13 and extends in the direction of the axis of the disc 3. One end 17a of the rod 17 abuts the backing plate 6a of the friction pad 6, and the other end 17b thereof extends into recess 9 passing through the opening 10. A retainer 18 is threadingly mounted on threaded portion 17c formed on the free end portion of the other end 17b of the rod 17. The central portion 17d of the rod 17 has a hexagonal cross-sectional and engages with one or more leg portions 19a of a retaining plate 19 which is non-rotatably mounted on the partitioning wall 8, whereby the rotation of the rod 17 is controlled.

A spring 20 is interposed between the wall 8 and the retainer 18 with one end 20a thereof passing through the retaining plate 19 to extend into the partitioning wall 8 and the other end 20b thereof extending into a hole formed in the retainer 18. The spring 20 presses the nut 13 against the ramp plate 11 in the non-actuated condition of the brake and also acts to prevennt the balls 16 from escaping from grooves 14 and 15. Shown at 21 in FIG. 2 is a dust boot, and at 22 is a cover closing the recess 9.

As shown in FIGS. 2 and 4, according to the present invention, a projection or a lug 23 is provided on the stationary member 1 and projecting toward the actuating lever 12 and is spaced from the actuating lever 12 a small distance S when the friction pads 5 and 6 are new and in the non-actuated condition of the brake. The distance S is larger than the machining and assembling tolerance of the parts of the brake but is smaller than a distance t (FIG. 3) which is defined by the distance of the rearward (leftward as viewed in FIG. 2) displacement of the arm portion 4a of the caliper 4 for permitting the mounting or dismounting of the friction pad 5 on or from the second portions 2b of the pins 2. The arm portion 4a of the caliper 4 can effect such displacement since the inner ends of the first portions 2a of the pins 2 are spaced from the bottoms of pin receiving bores in the caliper 4 a distance t' which corresponds to or is larger than the distance t as shown in FIG. 3. The distance t is nearly equal to the sum of the height h of the projection 23 and the distance S.

Thus, in the non-actuated condition of the brake, the main body portion 4b of the caliper 4 can not be displaced toward the stationary member 1 or in the direction of arrow Y as viewed in FIG. 3 by the distance t since the actuating lever 12 will abut the projection 23. Therefore, the dismounting or escaping of the friction pad 5 from the pins 2 can reliably be prevented.

When the actuating lever 12 is rotated in the direction of arrow X as seen in FIG. 1, the lever 12 displaces in the direction of arrow Z as viewed in FIG. 4, and the actuating lever 12 does not interfere with the projection 23 even though the main body portion 4b of the caliper 4 is displaced toward the stationary member 1 by the distance t. In the normal actuating condition of the brake the actuating lever 12 rotates in the X direction as viewed in FIG. 1, and nut 13 rotates relative to the ramp plate 11 so that the balls 16 displace the nut 13 away from the ramp plate 11 thereby pressing the friction pad 6 against the disc 3 through the rod 17. The main body portion 4b moves in the direction away from the stationary member 1 due to the reaction force, and the arm portion 4a of the caliper 4 presses the friction pad 5 against the disc 3. The lever 12 approaches the stationary member 1 as viewed in FIG. 5, and the distance S' between the lever 12 and the stationary member 1 is larger than the distance S but is usually less than the sum of s+t. However, the lever 12 is displaced from the projection 23 as shown in FIG. 5, The projection 23 does not interfere with the actuating lever 12.

When the actuating lever 12 is released, the spring 20 acts through the nut 13 to rotate the actuating lever 12 in the reverse direction and to displace the nut 13 toward the ramp plate 11. The force applied on the friction pads 5 and 6 is released.

In the second embodiment shown in FIGS. 6 and 7, a projection 23' is provided on the actuating lever 12. However, the function and effects of the projection 23' are similar to the projection 23 in the first embodiment.

As described hereinbefore, according to the invention, a projection is formed on either the actuating lever 12 or the stationary member 1 to restrict the movement of the main body portion 4b of the caliper 4 as it approaches the stationary member 1 only in the non-actuated condition of the brake, thus accidental displacement of the caliper can be avoided and the escaping of the friction pad can be prevented. The location and the arrangement of the projection is such that the projection does not interfere with the relative approaching movement of the stationary member 1 and the actuating lever when applying the brake.

What is claimed is:

1. A disc brake comprising: a stationary member adapted to be mounted on a vehicle on one side of a rotational disc; a caliper having a main body portion slidably mounted on the stationary member and having an arm portion straddling the circumferential edge of the disc; a pair of friction pads provided on opposite sides of the disc; a pin means secured to the stationary member and extending to the other side of the disc from the stationary member having one of said friction pads slidably mounted thereon on the other side of the disc, said main body portion of the caliper being movable toward the stationary member for forming a space between the arm portion and said friction pad through which said friction pad can be dismounted from the pin means; a brake actuating mechanism mounted on the main body portion of the caliper and including an actuating lever, said actuating lever being rotatable between a non-actuating position and an actuating position in a plane perpendicular to the axis of the disc and being displaceable toward the stationary member during actuation of the brake, the stationary member and the actuating lever having surfaces spaced in the direction of the axis of the disc; and a projection on one of said opposed surfaces and projecting toward the other surface and opposed to and abuttable against the other surface when said actuating lever is in the non-actuating position for preventing the main body portion of the caliper from being displaced toward the stationary member in the non-actuated condition of the brake for forming said space, and not opposed when said actuating lever is in the actuating position for allowing displacement toward said stationary member when said actuating lever is in the actuating position, whereby the friction pad cannot be dismounted from the pin when said actuating lever is in the non-actuating position.

2. A disc brake as claimed in claim 1 in which said projection is on said stationary member.

3. A disc brake as claimed in claim 1 in which said projection is on said actuating lever.

* * * * *